(12) United States Patent
Emokpae et al.

(10) Patent No.: US 12,476,006 B2
(45) Date of Patent: Nov. 18, 2025

(54) SMART MULTI-MODAL TELEHEALTH-IoT SYSTEM FOR RESPIRATORY ANALYSIS

(71) Applicant: Lasarrus Clinic and Research Center Inc., Middle River, MD (US)

(72) Inventors: Lloyd E. Emokpae, Middle River, MD (US); Wassila Lalouani, Catonsville, MD (US); Roland N. Emokpae, Jr., Middle River, MD (US); Mohamed Younis, Catonsville, MD (US)

(73) Assignee: LASSARRUS CLINIC AND RESEARCH CENTER INC., Middle River, MD (US)

( * ) Notice: Subject to any disclaimer, the term of this patent is extended or adjusted under 35 U.S.C. 154(b) by 620 days.

(21) Appl. No.: 17/837,357

(22) Filed: Jun. 10, 2022

(65) Prior Publication Data

US 2023/0008860 A1 Jan. 12, 2023

Related U.S. Application Data

(60) Provisional application No. 63/220,494, filed on Jul. 10, 2021.

(51) Int. Cl.
*G16H 50/20* (2018.01)
*A61B 5/00* (2006.01)

(52) U.S. Cl.
CPC ........... *G16H 50/20* (2018.01); *A61B 5/0004* (2013.01); *A61B 5/0022* (2013.01);
(Continued)

(58) Field of Classification Search
CPC ... A61B 5/0004; A61B 5/0022; A61B 5/7278; A61B 5/7267; A61B 2562/0204;
(Continued)

(56) References Cited

U.S. PATENT DOCUMENTS 8,340,740 B2 12/2012 Holzer et al.
8,547,982 B2 10/2013 Sultan et al.
(Continued)

FOREIGN PATENT DOCUMENTS

| CN | 108564942 B | 9/2018 |
|---|---|---|
| KR | 20210000321 A | 1/2021 |
| RU | 2752137 C1 | 7/2021 |

OTHER PUBLICATIONS

J. Amaral, et al., "Differential diagnosis of asthma and restrictive respiratory diseases by combining forced oscillation measurements, machine learning and neuro-fuzzy classifiers," 2020 Medical and Biological Engineering and Computing (Year: 2020).*

(Continued)

*Primary Examiner* — Eric F Winakur
*Assistant Examiner* — Sienna C Pyle
(74) *Attorney, Agent, or Firm* — University of Maryland Carey School of Law

(57) ABSTRACT

A smart multi-modal telehealth IoT system for respiratory analysis. Such a system includes a body area sensor network comprised of meshed wireless sensor nodes and advanced machine learning techniques. The system may be used to remotely diagnose a user's respiratory illness and monitor their health.

13 Claims, 3 Drawing Sheets

(52) U.S. Cl.
CPC .......... *A61B 5/6804* (2013.01); *A61B 5/7267* (2013.01); *A61B 5/7278* (2013.01)

(58) Field of Classification Search
CPC ......... A61B 5/0024; A61B 5/08; A61B 5/389; A61B 5/1135; A61B 7/003; A61B 5/7264; A61B 5/7282; A61B 5/7275; A61B 5/0816; G16H 50/20
See application file for complete search history.

(56) References Cited

U.S. PATENT DOCUMENTS

| | | |
|---|---|---|
| 9,582,072 B2 | 2/2017 | Connor |
| 9,687,208 B2 | 6/2017 | Tsai et al. |
| 9,888,868 B2 | 2/2018 | Sarrafzadeh et al. |
| 10,028,675 B2 | 7/2018 | Patel et al. |
| 10,327,698 B2 | 6/2019 | Biswas et al. |
| 10,456,604 B2 | 10/2019 | Cheatham et al. |
| 10,542,889 B2 | 1/2020 | Ramesh et al. |
| 10,661,010 B1 | 5/2020 | Tsinberg |
| 10,671,838 B1 | 6/2020 | Bogan, III et al. |
| 10,709,353 B1 | 7/2020 | McLane |
| 10,720,151 B2 | 7/2020 | Sypniewski et al. |
| 10,765,399 B2 | 9/2020 | Emmanouilidou et al. |
| 10,898,160 B2 | 1/2021 | Spina et al. |
| 10,966,681 B2 | 4/2021 | Srinivasan |
| 11,089,995 B2 | 8/2021 | Mlynczak et al. |
| 11,145,400 B1 | 10/2021 | Neumann |
| 11,179,060 B2 | 11/2021 | Odame et al. |
| 11,272,864 B2 | 3/2022 | Dwarika |
| 11,307,064 B2 | 4/2022 | Choi et al. |
| 11,308,619 B2 | 4/2022 | Sainz de Cea et al. |
| 11,484,211 B2 | 11/2022 | Shallom |
| 2008/0281220 A1 | 11/2008 | Sharifpour |
| 2009/0131758 A1 | 5/2009 | Heywood et al. |
| 2011/0034818 A1 | 2/2011 | Gat et al. |
| 2011/0125044 A1 | 5/2011 | Rhee et al. |
| 2012/0283598 A1 | 11/2012 | Horii et al. |
| 2013/0030258 A1 | 1/2013 | Cheung et al. |
| 2014/0126732 A1 | 5/2014 | West et al. |
| 2015/0351690 A1 | 12/2015 | Toth et al. |
| 2017/0143977 A1 | 5/2017 | Kaib et al. |
| 2017/0156680 A1 | 6/2017 | Barretto et al. |
| 2017/0157430 A1 | 6/2017 | Cheatham et al. |
| 2017/0161451 A1 | 6/2017 | Weinstein |
| 2017/0231528 A1 | 8/2017 | Nathan |
| 2017/0347969 A1 | 12/2017 | Thakur et al. |
| 2018/0035901 A1 | 2/2018 | Cronin et al. |
| 2018/0047200 A1 | 2/2018 | O'Hara et al. |
| 2018/0108440 A1* | 4/2018 | Stevens .................. G06N 3/044 |
| 2018/0139518 A1 | 5/2018 | Touma et al. |
| 2019/0076080 A1 | 3/2019 | Prado |
| 2019/0088367 A1 | 3/2019 | Stamatopoulos et al. |
| 2019/0134396 A1 | 5/2019 | Toth et al. |
| 2019/0151640 A1 | 5/2019 | Weber |
| 2019/0167176 A1 | 6/2019 | Annoni et al. |
| 2019/0167927 A1 | 6/2019 | Dagnello et al. |
| 2019/0231262 A1 | 8/2019 | Nasry |
| 2019/0266491 A1 | 8/2019 | Gao |
| 2019/0266723 A1 | 8/2019 | Blanchard et al. |
| 2019/0298987 A1 | 10/2019 | Freeman et al. |
| 2019/0302460 A1 | 10/2019 | Kaul et al. |
| 2019/0365263 A1 | 12/2019 | Raj et al. |
| 2020/0093459 A1 | 3/2020 | Rahman et al. |
| 2020/0183047 A1 | 6/2020 | Denli et al. |
| 2021/0034921 A1 | 2/2021 | Pinkovich et al. |
| 2021/0043321 A1 | 2/2021 | Deterding et al. |
| 2021/0045656 A1 | 2/2021 | Rahman et al. |
| 2021/0113099 A1 | 4/2021 | Rogers et al. |
| 2021/0128074 A1 | 5/2021 | Leydon |
| 2021/0169326 A1 | 6/2021 | Emokpae |
| 2021/0275023 A1 | 9/2021 | Kalantarian et al. |
| 2021/0315480 A1 | 10/2021 | Odame et al. |
| 2021/0345939 A1* | 11/2021 | Jumbe .................... H04R 1/028 |
| 2021/0353244 A1 | 11/2021 | Kiely et al. |
| 2021/0369232 A1 | 12/2021 | Chen et al. |
| 2021/0398683 A1 | 12/2021 | Clifford et al. |
| 2021/0402212 A1 | 12/2021 | Schupp et al. |
| 2022/0005601 A1 | 1/2022 | Cox et al. |
| 2022/0068476 A1 | 3/2022 | Link et al. |
| 2022/0122728 A1 | 4/2022 | Wahl et al. |
| 2022/0248966 A1 | 8/2022 | Freeman et al. |
| 2022/0359070 A1 | 11/2022 | Lalouani et al. |
| 2023/0074574 A1 | 3/2023 | Emokpae et al. |
| 2023/0177217 A1 | 6/2023 | Hughes |
| 2023/0225695 A1 | 7/2023 | Dodson et al. |

OTHER PUBLICATIONS

Z. Zhang, et al., "Snore-GANs: Improving Automatic Snore Sound Classification With Synthesized Data,", 2020, IEEE Journal of Biomedical and Health Informatics (Year: 2020).*

S. Trivedy, et al., "Microphone based Smartphone enabled Spirometry Data Augmentation using Information Maximizing Generative Adversarial Network," 2020 IEEE International Instrumentation and Measurement Technology Conference (Year: 2020).*

G. B. Rehm et al., "Leveraging IoTs and Machine Learning for Patient Diagnosis and Ventilation Management in the Intensive Care Unit," 2020, IEEE Pervasive Computing (Year: 2020).*

Medical Applications of Wireless Body Area Networks, Khan et al., International Journal of Digital Content Technology and its Applications, vol. 3, No. 3, Sep. 2009.

Wearable and Implantable Wireless Sensor Network Solutions for Healthcare Monitoring, Darwish et al., Sensors, 2011, vol. 11, pp. 5561-5595; May 26, 2011.

Benchmarking of eight recurrent neural network variants for breath phase and adventitious sound detection on a self-developed open-access lung sound database—HF_Lung_V1, Hsu et al., 2021 https://arxiv.org/pdf/2102.03049.pdf.

Multi-channel lung sound classification with convolutional recurrent neural networks, Messner et al., Computers in Biology and Medicine, vol. 122, 2020, 103831, ISSN 0010-4825 https://www.sciencedirect.com/science/article/abs/pii/S0010482520301955?via%3Dihub.

Investigating into segmentation methods for diagnosis of respiratory diseases using adventitious respiratory sounds, Wu et al., 42nd Annual International Conference of the IEEE Engineering in Medicine Biology Society, 2020, https://kar.kent.ac.uk/83024/1/09175783.pdf.

Deep learning based respiratory sound analysis for detection of chronic obstructive pulmonary disease, Srivastava et al., PeerJ Computer Science 7:e369 https://peerj.com/articles/cs-369/.

Altan, G., Kutlu, Y., & Allahverdi, N. (2019). Deep learning on computerized analysis of chronic obstructive pulmonary disease. IEEE journal of biomedical and health informative, 24(5), 1344-1350.

Bhalla, S., Liaqat, S., Wu, R., Gershon, A. S., de Lara, E., & Mariakakis, A. (2023). PulmoListener: Continuous Acoustic Monitoring of Chronic Obstructive Pulmonary Disease in the Wild. Proceedings of the ACM on the Interactive, Mobile, Wearable and Ubiquitous Technologies, 7(3), 1-24.

Emokpae, L. E., Emokpae Jr, R. N., Bowry, E., Bin Saif, J., Mahmud, M., Lalouani, W., . . . & Joyner Jr, R. L. (2022). A wearable multi-modal acoustic system for breathing analysis. The Journal of the Acoustical Society of America, 151(2), 1033-1038.

Fernandez-Granero, M. A., Sanchez-Morillo, D., & Leon-Jimenez, A. (2015). Computerised analysis of telemonitored respiratory sounds for predicting acute exacerbations of COPD. Sensors, 15(10), 26978-26996.

Frerichs, I., Paradiso, R., Kilintzis, V., Rocha, B. M., Braun, F., Rapin, M., . . . & Wacker, J. (2023). Wearable pulmonary monitoring system with integrated functional lung imaging and chest sound recording: a clinical investigation in healthy subjects. Physiological Measurement, 44(4), 045002.

Hawthorne, G., Greening, N., Esliger, D., Briggs-Price, S., Richardson, M., Chaplin, E., . . . & Orme, M. W. (2022). Usability of wearable multiparameter technology to continuously monitor free-

(56) References Cited

OTHER PUBLICATIONS living vital signs in people living with chronic obstructive pulmonary disease: prospective observational study. JMIR Human Factors, 9(1), e30091.

Islam, B., Rahman, M. M., Ahmed, T., Ahmed, M. Y., Hasan, M. M., Nathan, V., . . . & Gao, J. A. (2021). BreathTrack: detecting regular breathing phases from unannotated acoustic data captured by a smartphone. Proceeding of the ACM on Interactive, Mobile, Wearable and Ubiquitous Technologies, 5(3), 1-22.

Kaul S. Remap-West-Flare—FLAg for Review Efficacy Investigation REMAPWESTFLARE). Feb. 2023. Report No. NCT05745155.

Kemalasari et al., Medical Spirometer for Diagnosing COPD Base on the Measurement of FVC and FEV1, 2020 J. Phys.: Conf. Ser. 1569 032061.

Kumar, A., Mitra, V., Oliver, C., Ullal, A., Biddulph, M., & Mance, I. (2021, November). Estimating respiratory rate from breath audio obtained through wearable microphones. In 2021 43rd Annual International Conference of the IEEE Engineering in Medicine & Biology Society (EMBC) (pp. 7310-7315). IEEE.

Lalouani, W., Younis, M., Emokpae Jr, R. N., & Emokpae, L.E. (2022). Enabling effective breathing sound analysis for automated diagnosis of lung diseases. Smart Health, 26, 100329.

Larson, E. C., Goel, M., Boriello, G., Heltshe, S., Rosenfeld, M., & Patel, S. N. (Sep. 2012). SpiroSmart: using a microphone to measure lung function on a mobile phone. In Proceedings fo the 2012 ACM Conference on ubiquitous computing (pp. 280-289).

Lee, S. H., Kim, Y.S., Yeo, M. K., Mahmood, M., Zavanelli, N., Chung, C., . . . & Yeo, W. H. (2022). Fully portable continuous real-time auscultation with a soft wearable stethoscope designed for automated disease diagnosis. Science Advances, 8(21), eabo5867.

Lewandowski, M., Płaczek, B., & Bernas, M. (2020). Classifier-based data transmission reduction in wearable sensor network for human activity monitoring. Sensors, 21(1), 85.

Liao, X., Wu, Y., Jiang, N., Sun, J., Xu, W., Gao, S., . . . & Li, Q. (2023). Automated detection of abnormal respiratory sound from electronic stethoscope and mobile phone using MobileNetV2. Biocybernetics and Biomedical Engineering, 43(4), 763-775.

Majumder AK. Computer Analysis of Frequency Spectrum of the Phonopulmogram. Proc Annu Symp Comput Appl Med Care. Nov. 5, 1980; 1 :266-71. PMCID: PMC2203739.

Rahman, M. M., Ahmed, T., Nemati, E., Nathan, V., Vatanparvar, K., Blackstock, E., & Kuang, J. (Mar. 2020). Exhalesense: Detecting high fidelity forced exhalations to estimate lung obstruction on smartphones. In 2020 IEEE International Conference on Pervasive Computing and Communications (PerCom) (pp. 1-10). IEEE.

Tayeh, G. B., Makhoul, A., Laiymani, D., & Demerjian, J. (2018). A distributed real-time data prediction and adaptive sensing approach for wireless sensor networks. Pervasive and Mobile Computing, 49, 62-75.

Viswanath, V., Garrison, J., & Patel, S. (Jul. 2018). SpiroConfidence: determining the validity of smartphone based spirometry using machine learning. In 2018 40th Annual International Conference of the IEEE Engineering in Medicine and Biology Society (EMBC) (pp. 5499-5502). IEEE.

Vito, D. (2012). A new system for tailoring and monitoring mechanical ventilation by a wearable device at home, Chapter 3, "Materials and Methods." Downloaded Jun. 10, 2024 from https://www.politesi.polimi.it/bitstream/10589/65161/5/2012_10_Vito.pdf.

Xie, W., Hu, Q., Zhang, Q. (2023). EarSpiro: Earphone-based Spirometry for Lung Function Assessment. Proceedings of the ACM on Interactive, Mobile, Wearable and Ubiquitous Technologies, 6(4), 1-27.

Xu, W., Huang M. C., Liu, J. J., Ren, F., Shen, X., & Sarrafzadeh, M. (May 2013). mCOPD: mobile phone based lung function diagnosis and exercise system for COPD. In Proceeding of the 6th International Conference on PErvasive Technologies Related to Assistive Environments (pp. 1-8).

Zubaydi, F., Sagahyroon, A., Aloul, F., Mir, H., & Mahboub, B. (Dec. 2020). Using mobiles to monitor respiratory diseases. In Informatics (vol. 7, No. 4, p. 56). MDPI.

* cited by examiner

SMART MULTI-MODAL TELEHEALTH-IoT SYSTEM FOR RESPIRATORY ANALYSIS

CROSS REFERENCE TO RELATED APPLICATIONS

This patent application claims priority to U.S. Provisional Application No. 63/220,494, filed on Jul. 10, 2021, which is included herein by reference in its entirety.

BACKGROUND OF THE INVENTION

Field of the Invention

The present invention relates to remote health monitoring and diagnosis of respiratory illnesses using wireless wearable sensors and advanced machine learning technology.

Background Art

The emergence of the COVID-19 pandemic led to an unprecedented burden on the health care system both nationally and world-wide. Such a global-scale outbreak caused an overwhelming load on healthcare facilities and personnel. Moreover, caregivers are at high risk for, and many have developed, infection. As a result, there is an increased demand for telehealth services to carry this extra load, especially when social distancing measures are employed to stay infection. Telehealth employs a combination of communications, sensing, computation, and human computer interaction technologies that are used in diagnosis, treatment, and patient monitoring without disturbing patients' quality of life. It also provides a conduit for allowing physicians to provide an expected level of care through sensor biofeedback.

Major breakthroughs in wearable medical devices and the emergence of the Internet of Things (IoT) have revolutionized the healthcare industry. Particularly, these advanced technologies enabled the development of effective and economical solutions for remote and continuous patient monitoring. For example, an individual's heartbeat can be measured using remote means to detect cardiac unrest and automatically call for emergency assistance. Such a monitoring service was traditionally possible only through hospitals or specialized clinics and was expensive for insurance companies as well as inconvenient for patients and their families. For health insurance providers, reducing costs is paramount for maintaining affordable premiums. Moreover, wearable sensors are invaluable for monitoring body conditions under stress, e.g., while exercising or playing sports.

Such conditions include respiration rate. Respiration rate reflects breathing frequency and can be indicative of health problems. Specifically, abnormalities in respiration rate are linked to hypoxaemia and hypercarbia which are often associated with respiratory illnesses such as COVID-19. In addition, many studies correlate abnormal respiratory rates with pneumonia, pulmonary embolism, weaning failure, and overdose. Other studies have shown that respiratory rate identifies patients with high risk of cardio-pulmonary catastrophic deterioration more accurately than using blood pressure and pulse rate. Moreover, respiratory rate can be inferred from physiological signals such as an electrocardiogram.

Recent advances in wearable devices and smart sensors have led to the development of practical "StethoVest" systems. However, the prior art shows that such vests either require physical tethering to a computer which performs the data acquisition, or the current wireless versions of these vests can be used for auscultation only. There are currently no existing "StethoVest" or wearable systems that employ a network of smart multimodal sensor nodes, each with acoustic sensing capabilities, for heart and lung auscultation and diagnosis.

BRIEF DESCRIPTION OF THE DRAWINGS/FIGURES

Advantages of embodiments of the present invention will be apparent from the following description of the exemplary embodiments thereof, which description should be considered in conjunction with the accompanying drawings.

Figure 1:
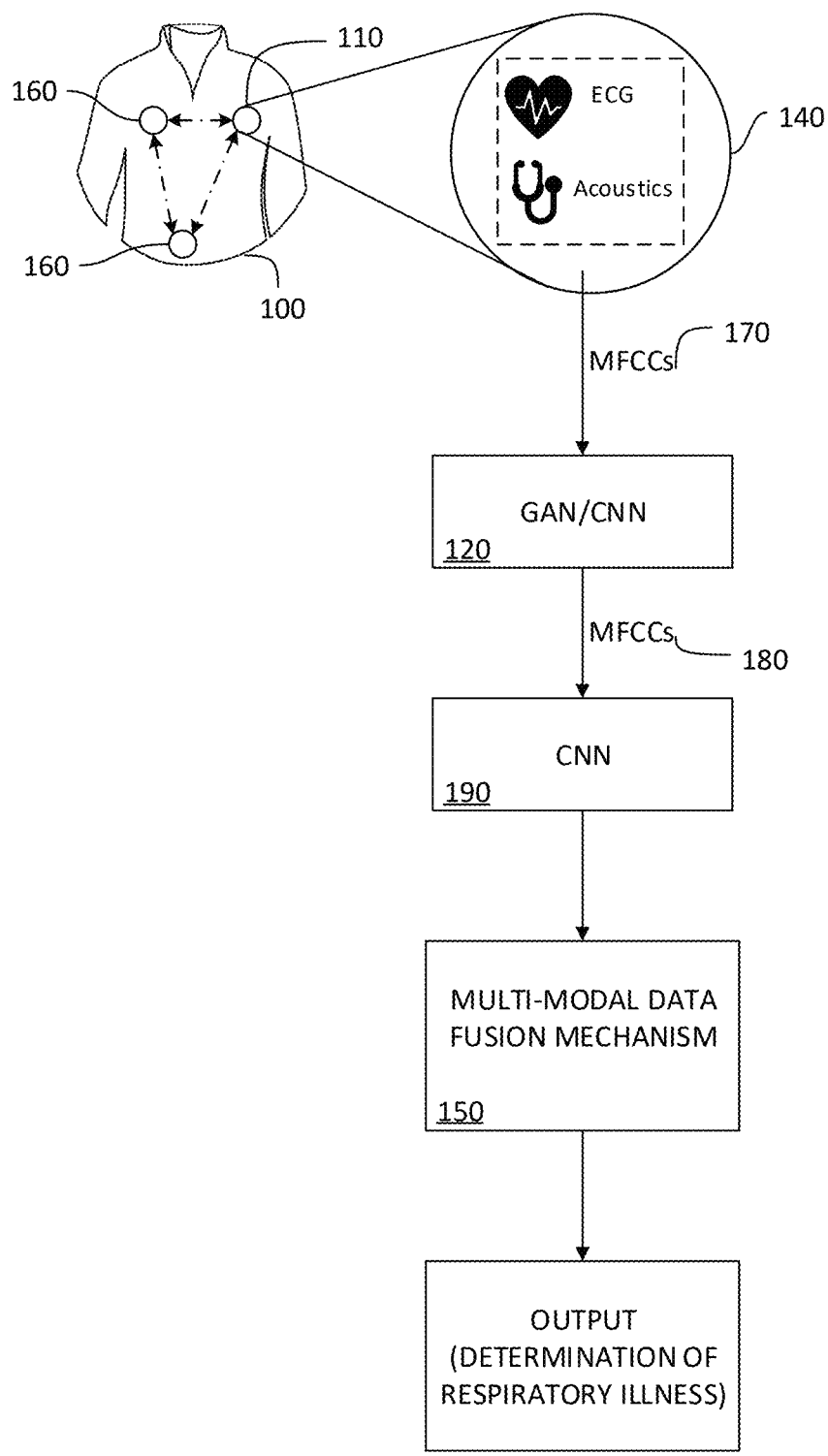
FIG. 1 shows an exemplary embodiment of the flow path that user data takes, starting with collection of user data and ending with diagnosis.

Further embodiments, features, and advantages of the present invention, as well as the operation of the various embodiments of the present invention, are described below with reference to the accompanying drawings.

DETAILED DESCRIPTION OF THE INVENTION

While specific configurations and arrangements are discussed herein, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Additionally, well-known elements of exemplary embodiments of the invention will not be described in detail or will be omitted so as not to obscure the relevant details of the invention. Furthermore, to facilitate an understanding of the description, discussion of several terms used herein follows.

As used herein, the word "exemplary" means "serving as an example, instance, or illustration." The embodiments described herein are not limiting, but rather are exemplary only. The described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The system described herein distinguishes itself through the inclusion of a diverse set of sensors and pursuing a multimodal methodology for detecting and tracking the symptoms of COVID-19. According to data regarding infected patients in Wuhan, China [H. Shi, X. Han, N. Jiang, Y. Cao, O. Alwalid, J. Gu, et al., "Radiological findings from 81 patients with COVID-19 pneumonia in Wuhan, China: a descriptive study," *The Lancet Infectious Diseases,* 20(4), April 2020], the COVID-19 symptoms with commonality are, fever (73%), cough (59%), shortness of breath (31%), muscle ache (11%), confusion (9%), headache (8%), sore throat (5%), rhinorrhea (4%), chest pain (2%), diarrhea (2%), and nausea & vomiting (1%). From these statistics, it can be concluded that the strongest indication of infection are pulmonary-related impacts and breathing disorders.

Therefore, the system described here focuses on respiratory related symptoms and aggregates different sensing modalities to detect signs of COVID-19 illness and track the patient's condition over time.

The Telehealth-IoT system described here monitors patients remotely in a non-intrusive manner. Therefore, acoustic sensors are primarily used in tracking respiratory related symptoms. Cough and breathing sounds are analyzed to detect pulmonary related disease, namely, asthma, pneumonia, and lung inflammation. This approach distinguishes itself by employing specific deep learning techniques to detect the COVID-19 based on the features extracted from cough and breathing sounds. PPG and ECG sensing modalities area included to detect the respiratory rate to be used as features for our multimodal diagnostics.

As articulated earlier, our Telehealth-IoT opts to monitor patients remotely in a non-intrusive manner. Therefore, acoustic sensors are primarily used in tracking respiratory related symptoms. We analyze cough and breathing sounds to detect pulmonary related disease, namely, asthma, pneumonia, and lung inflammation. Our approach distinguishes itself by employing specific deep learning techniques to detect the COVID-19 based on the features extracted from cough and breathing sounds. We further include PPG and ECG sensing modalities to detect the respiratory rate to be used as features for our multimodal diagnostics. Our results confirm the effectiveness of our single and multi-modality diagnostics. In the following, each classification technique is briefly explained and then our aggregation mechanism for COVID-19 diagnostic is highlighted.

According to an exemplary embodiment, and referring to the figures generally, a smart multi-modal telehealth-IoT system for respiratory analysis is described. According to an exemplary embodiment shown in FIG. 1, the system uses a body area sensor network (BASN) 100 that incorporates a mesh of wireless sensor nodes 160 networked to measure full torso range of motion, muscle activation, and body vitals 140 such as photoplethysmography, electrocardiography, electromyography, acoustic cardiography, and/or acoustic myography for example. An embodiment of the system uses Zigbee® to support inter-node connectivity.

The sensor nodes 160 transmit their data to a gateway node 110 that serves as the interface for the BASN. The gateway node 110 may be designated from amongst the sensor nodes 160 within the BASN. Alternatively, a separate node outside of the BASN may serve as the gateway node 110. In an embodiment of the invention, the system leverages electrocardiogram, acoustic cardiography, and temperature sensors for physiological monitoring, auscultation of lung sounds, and fever detection. Signal processing techniques are used for wireless beamforming and deconvolution of incoming lung sounds. The real-time sensor data 140 is processed by the gateway node 110 if feasible, or it may be relayed through the gateway node to a remote processing center over a secure connection.

An exemplary embodiment of the invention may be used to detect COVID-19. The system relies on analyzing the user's cough sounds to not only assess the condition of the respiratory system but also the distinguish symptoms of certain respiratory illnesses, such as COVID-19, from other illnesses (e.g., asthma). The wearable acoustic sensor nodes 160 may acquire the user's cough sounds which may then be processed at the gateway node 110 or remotely at a medical facility.

Figure 2:
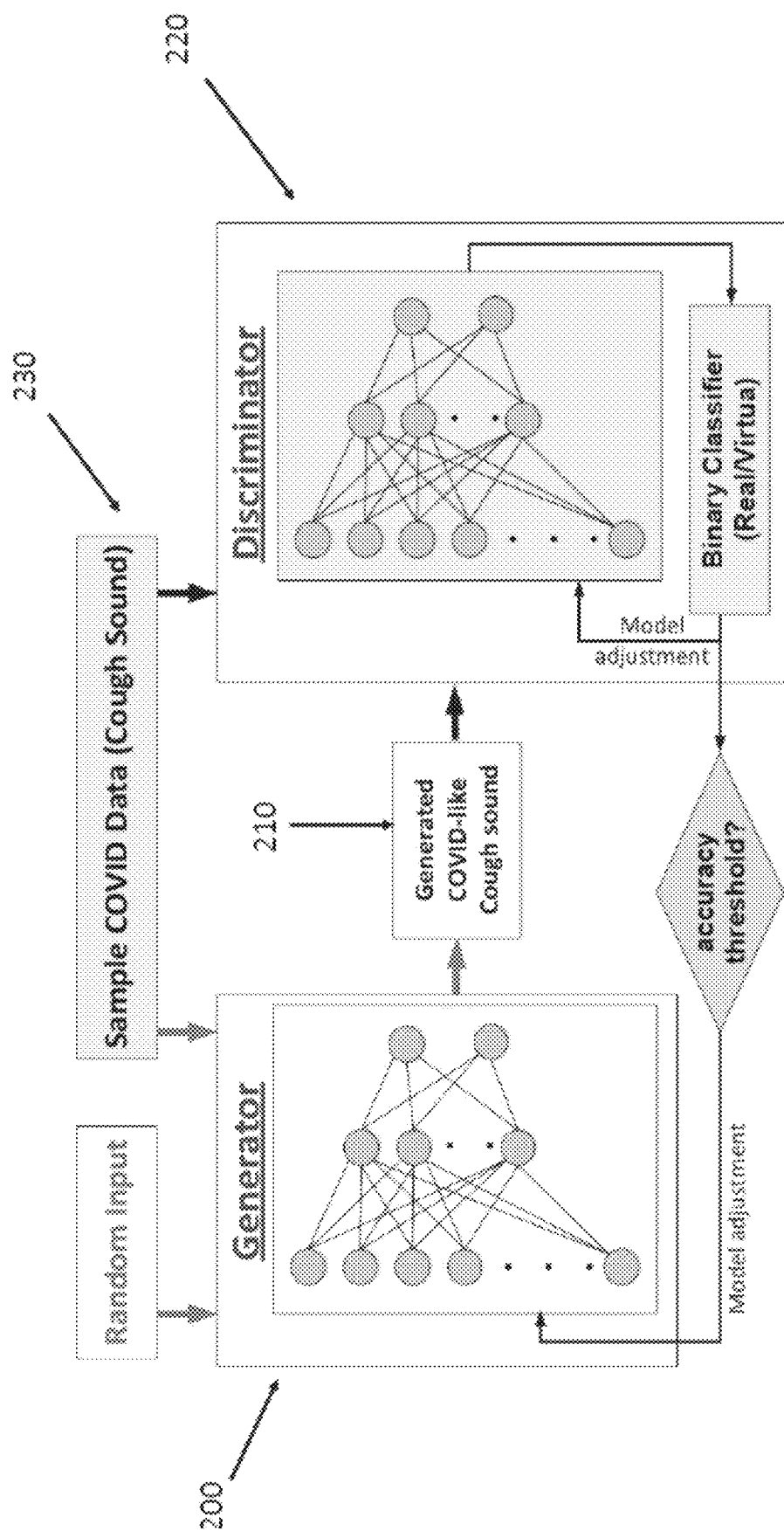
FIG. 2 shows an exemplary embodiment of the generative adversarial network used to train the one or more convolutional neural networks.

The real-time sensor data 140 including acoustics collected in the form of processed cough sounds are used to classify the respiratory illness. The present invention does so by using two convolutional neural networks (CNN). The first CNN 120 employs a generative adversarial network (GAN) to generate synthetic acoustic respiratory illness sounds. The GAN is fed with Mel-frequency cepstral coefficients (MFCC) 170 of real cough sounds from patients with a respiratory illness. The MFCCs 170 represent the acoustic data in the time/frequency domain. The GAN 120 employs two neural networks that try to defeat each other, as illustrated in FIG. 2. The first neural network 200 generates virtual data 210 while the second neural network acts as a discriminator model 220 trying to detect the virtual (i.e., non-real) data 210 within the entire dataset. The process continues while minimizing the probability of detecting such virtual data, thereby increasing the similarity between the real data 230 and generated data 210. Referring again to FIG. 1, the input MFCCs 170 to the GAN/CNN 120 is the data collected from the individual sensor nodes 160. The output of the GAN/CNN is synthetic respiratory illness sounds also in the form of MFCCs 180. The output MFCCs 180 are used as input for a second CNN 190.

Figure 3:
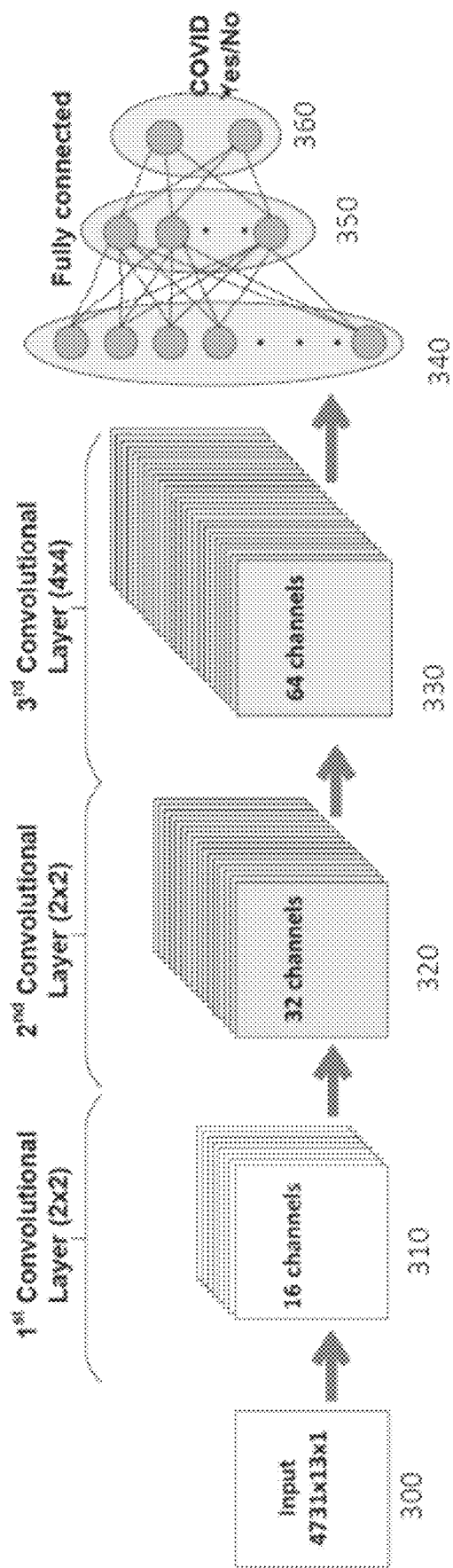
FIG. 3 shows an exemplary embodiment of the convolutional neural network classifier.

The second CNN 190 may be used to classify the user's MFCC data 170. The second CNN 190 is trained using actual user acoustic recordings 230 as well as the augmented (GAN-generated) data 210 from patients with a respiratory illness (e.g., COVID-19). An audio data set of patients known to have a respiratory illness may be used in the analysis. These audio data sets are split into non-overlapping training and testing sets. FIG. 3 shows the MFCC data 300 with dimension 4731×13×1 provided as an input to a first convolution layer 310. The output may then be fed to a second convolutional layer 320 having 32 channels and then a third convolutional layer 330 having 64 channels with 4×4 kernel size. The output may be flattened and then passed to a fully connected layer of 84 neurons 340, followed by 16 intermediate neurons 350 and then a final layer with two neurons 360. To achieve balanced training, the system uses the same number of respiratory illness samples as non-respiratory illness samples.

The acquired sound records from the sensor nodes may be analyzed over time using Mel-frequency to detect anomalous patterns. The system applies deep learning techniques to the MFCC breathing vectors for patients with respiratory illnesses. The system employs the generative learning mechanism, described above, to populate the dataset with breathing sounds reflecting respiratory illness complications. A CNN is used to classify the user's breathing sounds. In an embodiment, the architecture of the CNN model includes two convolutional layers followed by two dense nonlinear layers and one linear layer with a filter size of 4×4 for both convolutional layers.

The system correlates various indicators provided by analyzing data from the individual sensor nodes. In one embodiment, a voting ensemble-based mechanism is used to categorize the user's infection. Referring again to FIG. 1, respiratory illness indicators based on the single-modality (i.e., from a single sensor node) analysis may be used as inputs into the classifier CNN 190. The output of the classifier CNN 190 is fed into a multi-modal data fusion mechanism 150 that may assess whether the user has a specific respiratory illness, along with assessing the accuracy of the diagnosis. In an embodiment, the system applies a variety of classifiers, comprising SVM Gaussian kernel, Adaboost, Random Forest, and Decision Tree. The results of these classifiers are aggregated, and a hard vote is cast on whether the user has a specific respiratory illness.

In another embodiment, symptom indicators may be fused from the single-modality analysis using a fuzzy logic mechanism. This approach enables the correlation of data that is not provided by the wearable system (e.g., fatigue, headache, etc.). In this embodiment, an importance factor is used in diagnosis based on how common a symptom is for a specific respiratory illness.

An embodiment of the invention employs an energy conservation technique through predictive sampling. This is accomplished through in-network data processing, whereby certain BASN data transmissions are skipped without degrading data accuracy. When no serious health conditions are present, there are typically very few variations in the monitored physiological attributes, and therefore there are very few variations in the collected data. The invention exploits this fact by employing a machine learning model at the sensor side and on the gateway node.

The system may use a Long Short-Term Memory network. The model identifies the possible set of predictable samples than can be inferred by the gateway node. Analog sensing data from different modalities such as electrocardiography, electromyography, and acoustic myography exhibit known patterns with respect to a time series. By setting a certain variation threshold, [ALPHA], the sensor will skip the transmission if the difference between the predicted and actual data sample is negligible. The error bound for a reproduced data sample is controlled by adjusting the variation threshold, allowing for application along a wide range of sensor modalities. Any violation of the variation threshold results in an error, necessitating the transmission of the sample. Because errors are handled sequentially, an erroneous transmission will not cause error distortion among reconstructed signal segments.

The foregoing description and accompanying figures illustrate the principles, exemplary embodiments, and modes of operation of the invention. However, the invention should not be construed as being limited to the particular embodiments discussed above. Additional variations of the embodiments discussed above will be appreciated by those skilled in the art (e.g., features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for detecting and diagnosing a respiratory illness comprising:
   a meshed body area sensor network configured to collect and transmit, in real-time, health data of a user comprising user cough data and user physiologic signals data, the meshed body area sensor network comprising a gateway node and a plurality of sensor nodes;
   one or more convolutional neural networks communicatively coupled to the gateway node and configured to detect the respiratory illness based on the health data of the user;
   a conditional generative adversarial network configured to generate synthetic acoustic records based on said health data, said conditional generative adversarial network in communication with one of the one or more convolutional neural networks to enhance a classification of respiratory symptoms of the user; and
   a multi-modal data fusion logic to generate a diagnosis of the respiratory illness;
   wherein the one or more convolutional neural networks has been trained on synthetic acoustic records.

2. The system of claim 1, wherein said sensor network is configured to continuously monitor said user's health data after the diagnosis of the respiratory illness.

3. The system of claim 1, wherein each of said sensor nodes of the meshed body area sensor network comprise a plurality of wireless sensors configured to measure and communicate said user's health data, wherein the user's health data comprises one or more of full torso range of motion, muscle activation, body temperature, photoplethysmography, electrocardiogramyography, acoustic cardiography, and acoustic myography.

4. The system of claim 3, wherein said wireless sensors are configured to be embedded within the user's clothing.

5. The system of claim 4, wherein said real-time user health data is relayed from the wireless sensors to the gateway node, then to one or more remote centers over a secure connection.

6. The system of claim 1, wherein the meshed body area sensor network uses a high-level communication protocol for communication between the sensor nodes and the gateway node.

7. The system of claim 6, wherein the high-level communication protocol comprises one or more of Zigbee, Bluetooth, and Wi-Fi.

8. The system of claim 1, wherein said conditional generative adversarial network comprises a generator and a discriminator.

9. The system of claim 1, wherein said conditional generative adversarial network uses Mel-frequency cepstral coefficients as inputs to generate the synthetic acoustic records used to train the one or more convolutional neural networks.

10. The system of claim 1, wherein said multi-modal data fusion logic comprises a voting ensemble-based logic, wherein said voting ensemble-based logic is configured to use an output of the convolutional neural network as an input to one or more classifiers which are configured to then make a diagnostic assessment, whereby the outputs of said classifiers enable the voting ensemble-based mechanism to vote on whether the user has the respiratory illness.

11. The system of claim 10, wherein said classifiers comprise one or more of a SVM Gaussian kernel, Adaboost, a random forest, and a decision tree.

12. The system of claim 1, wherein said multi-modal data fusion logic comprises fuzzy logic wherein said fuzzy logic enables a fusion of more than one health data input, wherein the more than one health data input comprises the user health data provided by the meshed body area sensor network, additional user health data that is not provided by the meshed body area sensor network, and importance factors assigned to said user health data provided by the meshed body area sensor network and to the additional user health data, wherein the fuzzy logic is configured to determine whether the user has the respiratory illness based on said more than one health data input.

13. The system of claim 1, wherein the respiratory illness is COVID-19.

* * * * *